(12) United States Patent
Buchhorn

(10) Patent No.: US 7,721,142 B2
(45) Date of Patent: May 18, 2010

(54) COPYING PROCEDURES INCLUDING VERIFICATION IN DATA NETWORKS

(75) Inventor: Christoffer Buchhorn, Virum (DK)

(73) Assignee: Asensus, Virum (DK)

( * ) Notice: Subject to any disclaimer, the term of this patent is extended or adjusted under 35 U.S.C. 154(b) by 140 days.

(21) Appl. No.: 10/481,356

(22) PCT Filed: Jun. 18, 2002

(86) PCT No.: PCT/DK02/00412

§ 371 (c)(1),
(2), (4) Date: Mar. 25, 2004

(87) PCT Pub. No.: WO03/003211

PCT Pub. Date: Jan. 9, 2003

(65) Prior Publication Data

US 2004/0230863 A1   Nov. 18, 2004

(30) Foreign Application Priority Data

Jun. 19, 2001   (DK) .............................. 2001 00952

(51) Int. Cl.
*G06F 11/00* (2006.01)
(52) U.S. Cl. ......................................................... 714/6
(58) Field of Classification Search ....................... 714/6
See application file for complete search history.

(56) References Cited

U.S. PATENT DOCUMENTS

| | | | | |
|---|---|---|---|---|
| 5,592,611 A | | 1/1997 | Midgely et al. ........ | 395/182.02 |
| 5,596,706 A | | 1/1997 | Shimazaki et al. ..... | 395/182.04 |
| 5,608,865 A | * | 3/1997 | Midgely et al. ................ | 714/1 |
| 5,613,079 A | | 3/1997 | Debique et al. ............ | 395/468 |
| 5,649,185 A | * | 7/1997 | Antognini et al. .............. | 707/9 |
| 5,692,155 A | * | 11/1997 | Iskiyan et al. ................ | 711/162 |
| 5,852,713 A | | 12/1998 | Shannon ................. | 395/182.04 |
| 5,870,537 A | * | 2/1999 | Kern et al. ...................... | 714/6 |
| 5,907,672 A | | 5/1999 | Matze et al. ........... | 395/182.06 |
| 5,960,460 A | * | 9/1999 | Marasco et al. ............. | 711/162 |
| 5,978,565 A | | 11/1999 | Ohran et al. ........... | 395/182.11 |
| 5,987,621 A | | 11/1999 | Duso et al. ...................... | 714/4 |
| 6,044,444 A | | 3/2000 | Ofek ........................... | 711/162 |
| 6,052,797 A | | 4/2000 | Ofek et al. ...................... | 714/6 |
| 6,061,770 A | | 5/2000 | Franklin ...................... | 711/162 |

(Continued)

FOREIGN PATENT DOCUMENTS

EP   0 359 471 A2   3/1990

(Continued)

*Primary Examiner*—Scott T Baderman
*Assistant Examiner*—Paul F Contino
(74) *Attorney, Agent, or Firm*—Gifford, Krass, Sprinkle, Anderson & Citkowski, P.C.

(57) ABSTRACT

The present invention provides a method and a system for backing up data (copying data) from a primary computer system onto a removable backup medium and/or a copy computer system combined with verifying the data copied onto the medium and/or computer, whereby a more fail-safe backup system is provided and a stand-in computer in case of primary computer failure is readily available. In particular the verification includes functional tests, wherein the functionality of files and databases on the copy computer system is tested. The method offers the user a possibility of assuring that a functional backup has been obtained and furthermore, in case of breakdown of the primary computer the copy computer may function as stand-in.

23 Claims, 10 Drawing Sheets

U.S. PATENT DOCUMENTS

| | | | |
|---|---|---|---|
| 6,182,212 B1 | 1/2001 | Atkins et al. | 713/1 |
| 6,195,695 B1 * | 2/2001 | Cheston et al. | 709/221 |
| 6,202,111 B1 | 3/2001 | Wallach et al. | 710/103 |
| 6,442,709 B1 * | 8/2002 | Beal et al. | 714/33 |
| 6,516,999 B1 * | 2/2003 | Belonoznik | 235/382 |
| 6,564,336 B1 * | 5/2003 | Majkowski | 714/4 |
| 6,785,786 B1 * | 8/2004 | Gold et al. | 711/162 |
| 6,898,727 B1 * | 5/2005 | Wang et al. | 714/4 |

FOREIGN PATENT DOCUMENTS

| | | |
|---|---|---|
| EP | 0 869 439 A1 | 10/1998 |
| EP | 0910 019 A2 | 4/1999 |
| GB | 2 270 779 A | 3/1994 |

* cited by examiner

Restore of data from tape:

Change hardware configuration:

Change identity of machine:

Verification process:

Stand-in process activation and deactivation on the copy computer:

Stand-in process activation and deactivation on the copy computer:

COPYING PROCEDURES INCLUDING VERIFICATION IN DATA NETWORKS

COMPUTER PROGRAM LISTING

A computer program listing appendix is included on CD-R compact disc. The computer program listing appendix: contains one file; the file name is HOI-11202-P491US00-Computer code.txt; the file was created on Aug. 3, 2009; and the file has a size of 75 KB. The computer program listing appendix is incorporated herein in its entirety by reference.

FIELD OF THE INVENTION

The present invention relates to a method and a system for copying and verifying data from a computer onto a copy storage means.

BACKGROUND

In many small and medium-sized companies as well as private computers, back-up procedures include backing up data to a removable medium, such as a backup tape, CD-ROM, storage means on the Internet, Local Area Network, or the like. Many computer programs for backing up data includes a verification test, normally based on bit-by-bit test to verify the data on the removable medium directly against the primary storage means after conclusion of the backup procedure. It is however not until the backup medium is to be used for restoring data, that it is confirmed that a functional backup has been achieved the actual day.

Furthermore, in most cases when a server fails a new server has to be provided and configured before backup data may be restored to establish the full server function. Prior art has presented several solutions to these problems. U.S. Pat. No. 5,907,672 (Matze et al) describes a system for backing up data at a very high speed by saving a logical image copy of the volume to a backup medium. The logical Image may then be restored in its entirety to a disk volume with a different physical geometry in a disaster recovery mode, however the backup procedure does not include any functional test of the data located on the backup medium.

Data may also be protected against failure due to faulty storage device by "disk mirroring", in which data are stored redundantly on two or more disks. In U.S. Pat. No. 6,044,444 (Ofek) two data systems are interconnected by a data link for remote mirroring of data. That provides a copy of a server, whereby the copy may be stored at a location remote from the server, and the data on the copy are not at risk of being damaged in case any physical damage should occur to the server. However, the data on the copy is erased continuously by reading/mirroring new data to the copy. Thereby it is not possible to obtain and store backup data from previous days. In U.S. Pat. No. 5,978,565 (Ohran et al) a backup computer system runs a special mass storage access program that communicates with a mass storage emulator program on a network file server, making disks on the backup computer system appear like they were disks on the file server computer, whereby normal disk mirroring option of the file server operating system can be activated so that a copy of all data written to the mass storage device directly connected to the file server will also be written to the mass storage device on the backup computer. Then the backup computer system may function as a stand-in computer in case of server failure. However, no backup on a removable medium is provided.

U.S. Pat. No. 5,608,865 (Midgely et al) describes a stand-in system with backup media, wherein a stand-in computer creates an image of a file system on a server. The files on the stand-in computer are then copied to a backup medium, so that only the most recently created files are directly available on the stand-in computer, and the rest of the files may be retrieved from the backup medium. There is no test of the data on the backup medium, unless they are requested to be retrieved by the stand-in computer. Accordingly, no functional test of the data on the backup medium is conducted.

In EP 910019 ((INCM) Int. Computers Ltd.) a backup server is remotely connected to client computers via a public network and automatically performs regular backups of data from the client computers. The backed up data is stored in an automated tape library, and is periodically cloned to provide copies for off-site storage. However, no functional test of the data on the backup media is provided.

In U.S. Pat. No. 6,182,212 (IBM) a method for automating migration of system settings from an existing computer to a replacement computer system in response to a user input is described for use with user upgrades to a new hardware platform. However, there is no disclosure of the automatic migration of settings in connection with backup procedures.

In GB 2270779 a method for transfer of data and programs from a live computer database system to a back-up computer database system and for maintaining the back-up computer database system in readiness for emergency use is disclosed. The method implies conversion of programs and data on the live computer database system and transferring program and data to the back-up computer database system. Brief integrity checks are made on data in the back-up and live computer database system and balancing tests involving statistical analysis of the data tables in both computer database systems and verifying that data stored in both systems is the same. Balancing tests involve generation of statistics about a data table. The statistics include the number of rows in the table and may also include other values for example, the total value of a particular column.

However, GB 2270779 does not disclose any functional verification of the data on the back-up computer database system. The only verification of the data are statistical verification, such as number of rows and columns. Statistical verification only verifies that the same amount of datatables are transferred to the backup system, but is totally silent about the functionality of the data transferred. The system used comprises two computers, wherein the only disclosed communication between the two computers are through a back-up tape, thus verification cannot be performed on-line in GB 2270779.

SUMMARY OF THE INVENTION

The present invention provides a method and a system for backing up data (copying data) from a primary computer system onto a removable backup medium and/or a copy computer system combined with functionally verifying the data copied onto the medium and/or computer, whereby a more fail-safe backup system is provided and a stand-in computer in case of primary computer failure is readily available. Thus, the present invention relates in a first aspect to a method for copying data in at least one primary computer system from a primary storage means to a backup storage means and verifying said copied data, said method comprising:
  a) reading data from the primary storage means,
  b) writing said read data to the backup storage means,
  c) arranging a copy computer system having a copy storage means,
  d) reading backed up data from the backup storage means,
  e) writing backed up data to the copy storage means, f) obtaining copy data.

In another embodiment, the invention relates to a method for copying data in at least one primary computer system from a primary storage means to a backup storage means and verifying said copied data, said method comprising:
- a) reading data from the primary storage means,
- b) writing said read data to the backup storage means,
- c) arranging a copy computer system having a copy storage means,
- d) reading backed up data from the backup storage means,
- e) writing backed up data to the copy storage means,
- f) obtaining copy data, and
- g) verifying copy data in relation to data on the primary storage means.

In yet another embodiment, the invention relates to a method for copying data in at least one primary computer system from a primary storage means to a backup storage means and verifying said copied data, said method comprising:
- a) reading data from the primary storage means,
- b) writing said read data to the backup storage means,
- c) arranging a copy computer system having a copy storage means,
- d) reading backed up data from the backup storage means,
- e) writing backed up data to the copy storage means,
- f) obtaining copy data, and
- g) comparing copy data with data on the primary storage means thereby verifying the backed up data.

The comparison may be made from the copy data towards the data on the primary storage means or vice versa.

The method offers the user a possibility of assuring that a functional backup has been obtained and furthermore, in case of breakdown of the primary computer the copy computer may function as stand-in.

Furthermore, the invention relates to a method for copying data in at least one primary computer system from a primary storage means to a copy storage means and verifying said copied data, said method comprising:
- a) reading data from the primary storage means,
- b) arranging a copy computer system having a copy storage means,
- c) writing data to the copy storage means,
- d) obtaining copy data, and
- e) comparing copy data with data on the primary storage means thereby functionally verifying the copied data.

The method provides a functional test of the data on the copy computer system independent of whether a removable backup has been obtained in addition to the copy on the copy computer system.

For any of the methods the copy computer system may thus act as a stand-in system, as a backup system, optionally with removable storage means, such as removable disks for storage purposes, a test environment, or the copy computer may be an upgraded computer, for example when upgrading a computer with software, including operating system, and with hardware. In case of upgrading the copy computer is converted to the primary computer after successful comparison and/or verification of the copied data.

In another aspect the invention relates to a copy system comprising at least one primary computer system having a primary storage means and a backup storage means, said primary storage means and backup storage means being at least periodically connectable, said system further comprising a copy computer system having a copy storage means, said copy storage means and backup storage means being at least periodically connectable, and said primary storage means and said copy storage means being connected through a network. The system according to the invention allows a backup medium to be arranged remote from the primary computer system as well as the copy computer system, whereby the backed up data is not at risk of synchronous exposure to the same damages as the data of the primary computer system.

Furthermore, the copy computer system may also function as a test environment, with which upgrades, software tests, tutoring and the like may take place. Thereby, the risk of downperiods is reduced.

DRAWINGS

FIG. 1 pictures a system wherein a back-up tape is recorded from a primary server and verified on a copy server.

FIG. 2 pictures a system wherein the back-up tape is located in a computer at a remote location, and the copied data are transferred by means of a network.

FIG. 3 pictures a system wherein a backup is recorded from a primary server onto a copy computer and a functional verification of the data is performed.

Figure 9:
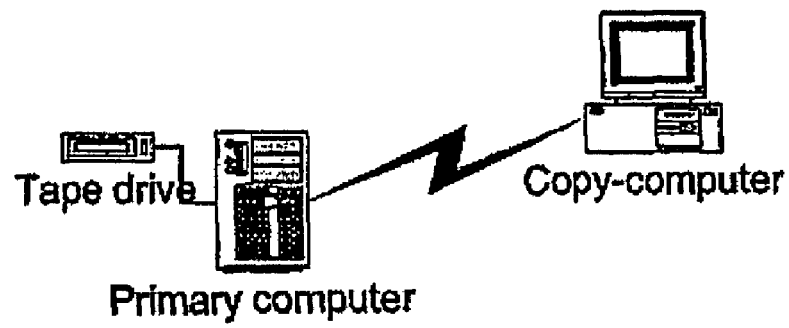

FIG. 9 pictures a primary computer with a tape driver.

Figure 10:
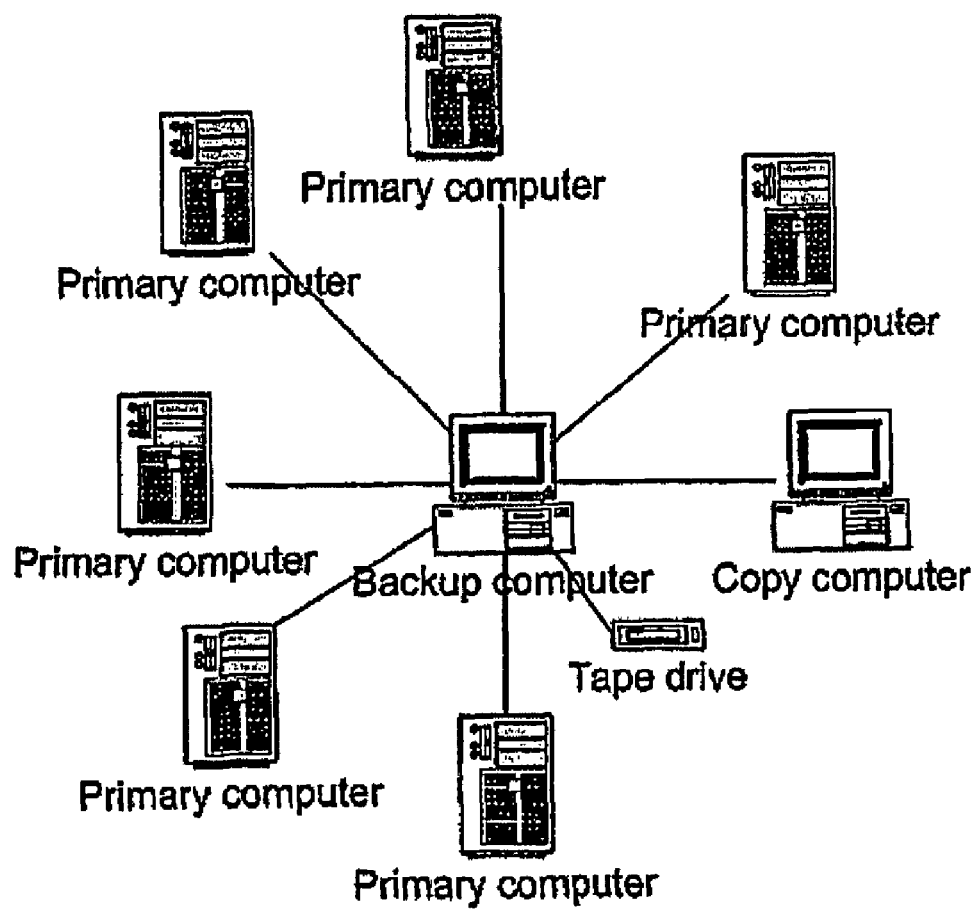

FIG. 10 pictures a set of primary computers transferring their copy to a central backup computer to which a backup unit, a tape robot, etc. are connected. After completion of the backup, the copy is transferred to a copy computer which again tests each completed copy.

Figure 11:
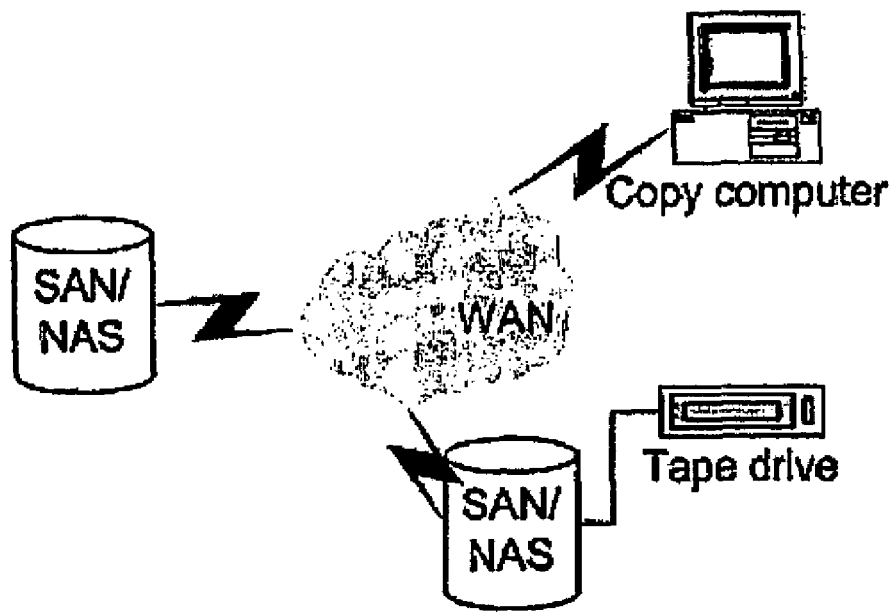

FIG. 11 pictures a system with an SAN/NAS with connected backup unit. A backup is taken of the contents of the SAN/NAS. After completion of the backup, the data are transferred back to a copy computer or downsized SAN/NAS.

Figure 12:
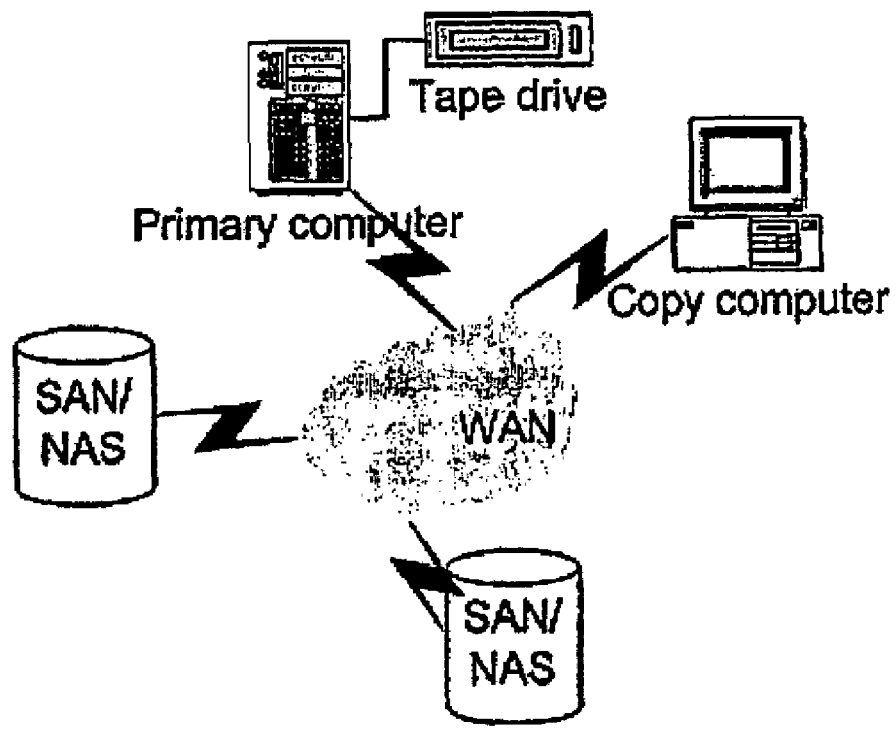

FIG. 12 pictures a system similar to the one shown in FIG. 11, but with a different purpose. A backup is taken from the point of view of the primary computer. Data/software may be stored on NAS/SAN, but the backup only contains the data which make the primary computer function in a correct manner. SAN/NAS may contain data for other primary computers, but these data may be copied for security purposes on another occasion. The location of backup drives is not important. They may be located at NAS/SAN or the copy computer as appropriate.

Figure 13:
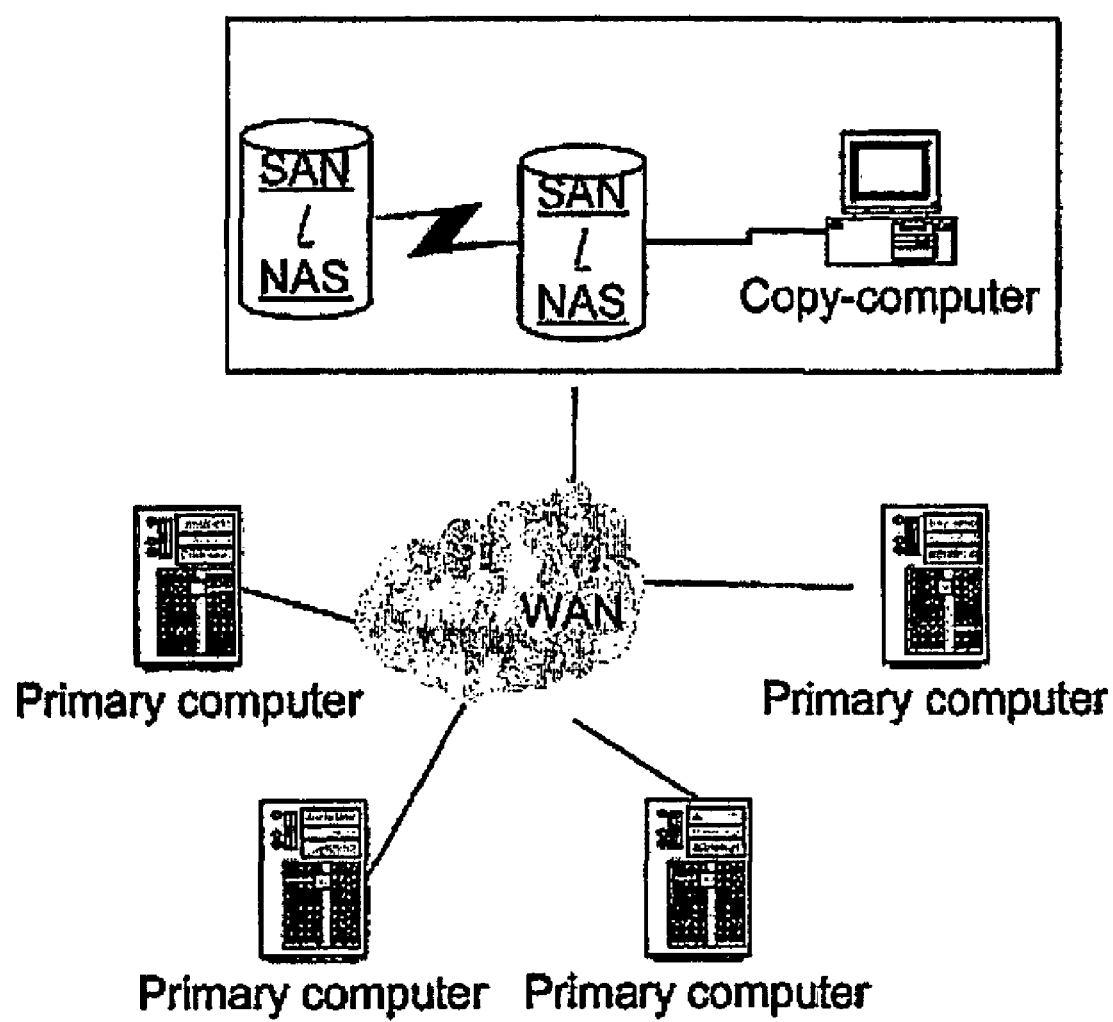

FIG. 13 pictures a system with a central storage means housing security copies for companies/affiliates. A backup is taken of all primary computers onto an SAN/NAS storage means. The stored security copies may be tested by transferring data by means of network from SAN/NAS to a copy computer located either centrally or locally.

DETAILED DESCRIPTION OF THE INVENTION

The method and system according to the invention is particular suitable for use in computer networks having at least one file server and optionally a plurality of client computers, such as working stations. However, the invention may also be applied in systems wherein the primary computer system functions both as server and working station. The invention presents a reliable backup and copy system capable of being provided at low costs, still presenting an elevated level of security compared to previous backup systems, due to the functional tests, and at the same time offering the possibility of easily providing a stand-in computer, should the primary computer fail.

The term computer is used in its normal meaning, i.e. to denote for example a server or a client computer.

The term "server" is used in its normal meaning, i.e. a dedicated file server, a database server, an application server, a terminal server, etc. Clients may login to the server, and use the services of the server, that is files, databases, printers etc.

The term "client computer" or "client" is also used in its normal meaning, i.e. a computer logged on to a server and using the services of the server. The client computers are normally working stations.

The computer systems according to this invention may be stationary computers as well as portable computers.

The term "primary computer system" means the system the data of which is determined to be copied/backed up for storage and/or later use. The primary computer system may be a server, a working station or any other computer comprising data to be copied.

The term "storage means" is used in its normal meaning, i.e. a means for storing data, files, databases etc. A storage means of a computer relates to the total storage means of the computer, for example the storage means of a server refers to the total storage of the server storing files, data, databases, as well as information and settings of the server. Storage means may also be Network Attached Storage (NAS) or Storage Area Network (SAN), see also the figures.

The term "copy data" means the data copied from the primary computer system, primarily data relating to files and databases; however, copy data may also include operating system, settings etc.

The term "copy computer" means an independent computer system not integrated in the primary computer system.

The terms "functionality" and "functional" are used in their normal meaning. For example, by functional test of data is meant that it is tested that data are accessible and may be used in the same way as they could in the original system. Also, test of functionality is performed by executing a series of file tests. The test will thus include comparing of content, observing the syntax, testing the ability of the host software to use a given file, e.g. the ability to open and read/write in the file.

The method and system according to the invention is suitable for backup procedures (full backup, incremental backup, etc.) that may be performed either automatically at scheduled intervals, or performed ad hoc. Furthermore, the invention is suitable for any kind of copying of data from one computer system to another computer system, or for providing a stand-in computer system when a primary computer system is to be replaced or changed, during which a period of down-time would otherwise be implicit.

Furthermore, the invention is suitable for any kind of upgrading of computer and/or of programs and/or of installing new programs, as primary computer system can remain in full function and safe from tampering due to technical manoeuvering.

Backup/Copy System

In one preferred embodiment the invention relates to a backup system, but the invention is not limited to a backup system. Thus, in one embodiment the invention relates to a copy system comprising at least one primary computer system having a primary storage means and a backup storage means, said primary storage means and said backup storage means being at least periodically connectable, said system further comprising a copy computer system having a copy storage means, said copy storage means and backup storage means being at least periodically connectable, and said primary storage means and said copy storage means being connected through a network, as well as method for use with said system.

The primary computer system may be any computer system as described above. The method and the system provides also for a set-up wherein at least two primary computer systems are arranged, such as a copy system comprising at least a first primary computer system and a second primary computer system, each primary computer system having a primary storage means, said system further comprising at least one backup storage means, said primary storage means and backup storage means being at least periodically connectable, said system further comprising at least one copy computer system having a copy storage means, said copy storage means and backup storage means being at least periodically connectable, and each of said primary storage means and said copy storage means being connected through a network. Accordingly, the total copy system may include at least two primary computer systems, such as at least three primary computer systems, such as at least four primary computer systems, all connected to the same copy computer system.

The backup storage means is preferably a removable storage medium, such as an external removable storage medium. A wide variety of media are commercially available today, such as magnetic media, memory media and optical media. In particular the storage medium is selected from a magnetic tape, a disk, a DVD, a CD-ROM, a memory smart card, an optical crystal, NAS, or SAN. It Is preferred that the backup medium is removable since it may then be stored at a (safe) location remote from the primary computer system and the copy computer system, so that any physical damage to said systems, such as theft, vandalism, fire, water flood, etc. will not damage the backup medium. Furthermore, by a removable backup medium, it is possible to use different units of media for each day, week or month, so that the previous backup is not erased when the next backup is performed. The backup storage means may be arranged in the primary computer system, such as a tape in a tape station in said computer system, or the backup storage means may be arranged in an individual device, and connected to the primary computer system by means of a network.

Independent of the arrangement of the primary computer system to the backup storage means, the copy computer system may either have the backup medium located locally or through a network, when data is read into the copy storage means. The present Invention also offers an advantage in that it may lead to a longer utility period for backup media, since they may be used, until no useful backup is conductable on said media, and flaws will immediately be disclosed due to the verification procedure/restore procedure.

Network

Anywhere in this context, a network according to the present invention may be a wired network or a wireless network, or a combination of these. The network may be an intranet (i.e. Local Area Network, LAN), an extranet (i.e. Wide Area Network, WAN) or the Internet, or again combinations of these. By the term intranet is meant a network in-house of the company. By the term extranet is meant a network functioning as an intranet between two remote locations. The term "Internet" is used in its conventional meaning.

In one embodiment the backup storage means is connected to the primary storage means through an intranet, and data are transferred from the primary storage means to the backup storage means by the intranet. Also, the copy storage means is connected to the backup storage means through the intranet, and data transport between these units are performed via the intranet. Furthermore, the primary storage means and the copy storage means are connected through the intranet as well, for verification and comparison purposes.

In another embodiment the backup storage means is connected to the primary storage means through the Internet, and data are transferred from the primary storage means to the backup storage means by the Internet. Also, the copy storage means is connected to the backup storage means through the Internet, and data transport between these units are performed via the Internet. As opposed hereto, the primary storage means and the copy storage means are connected through the intranet, for verification and comparison purposes.

As may be apparent to the person skilled in the art, other combinations of connections through Internet, intranet and extranet are possible, leaving a wide variety of possible arrangements in relation to location of primary computer system and copy computer system in relation to each other and individually in relation to the backup storage means.

Copy Computer System

The copy computer system may be any suitable computer system, such as a system identical to the primary computer system. It is however possible to use the invention with a copy computer system that differs from the primary computer system as long as it is compatible with the primary computer system. In a preferred embodiment the copy computer system is a down-sized computer system, whereby the costs of the backup system is lowered. By the term down-sized is meant a computer having for example a lower processor speed, a smaller hard disk, and/or a smaller memory as long as the capacity of the copy computer allows it to perform the relevant procedures. It is of course necessary that the copy computer at least has a storage capacity capable of storing the data from the primary computer system for example in a compressed mode. In case the primary computer system works with mirrored disks, the copy computer system needs only a storage capacity corresponding to one of the mirrored disks. Normally the copy computer system will be equipped with a smaller storage capacity than the primary computer system.

Optionally, the copy computer has a basic operating system capable of servicing the writing of data from the backup medium or from the primary computer system according to the procedure chosen. During verification the basic operating system is normally shut down, and instead the copy computer is using the copied operating system as a part of the verification test.

In another embodiment, restore software may be located on the backup storage means activatable when comparison and/or verification is to take place. Such software may also include adaptation and reboot of the system.

Configuration Change

Configuration changes may be conducted if necessary. The system configuration in the operating system copied from the primary computer system should be adapted to function with the hardware of the copy computer. In case of self-configuring operating systems, the change of configuration is conducted automatically. For some systems the hardware configuration of the copy computer system may if necessary be copied to the backed up operating system before rebooting the copy computer using the backed up operating system for verification, or the new hardware components are detected and relevant software and drivers are thereby installed. In another embodiment, the software is self-configuring for the hardware on the copy computer.

Backup/Upgrade System

In another embodiment of the invention, suitable for backup purposes and particular suitable for upgrading purposes, the invention relates to a copy system with or without a backup medium, namely a method for copying data located in at least one primary computer system from a primary storage means to a copy storage means and verifying said copied data, said method comprising:

a) reading data from the primary storage means,
b) arranging a copy computer system having a copy storage means,
c) writing data to the copy storage means,
d) obtaining copy data, and
e) comparing the functionality of copy data with data on the primary storage means thereby functionally verifying the backed up data.

In this method a copy computer is obtained, said copy computer comprising a functional copy of the data of the primary computer system. Of course the system also includes the possibility of arranging one primary computer copying to more copy computers. For example two or more copy computers may be used sequentially, so that one copy computer is in function per day. The copy computer is then available for a variety of purposes as discussed above. In particular the method is suitable for upgrading computers/programs when a system is to be replaced or changed, avoiding a downtime period. In the upgrading situation a backup medium may not be necessary.

Verification

The verification procedure is preferably a functional verification procedure. By the term "functional verification" and "functionally verifying" is meant that a copy is obtained for which the functionality of the data on the copy is checked, as contradistinction to a bit-by-bit test between primary storage means and backup storage means.

The verification is conducted after the data has been written to the copy storage means and the copy computer system is operating with the copy data. The verification of data on the copy computer is preferably conducted by a) Testing operating system and/or b) Testing one or more files on copy computer system and/or c) Testing requests to databases d) Testing custom services It is preferred that the verification comprises at least both steps b) and c), more preferably all three steps, more preferably all four steps.

The test may be conducted manually, that is visually on a screen by a person checking the data. In a preferred embodiment, the verification is conducted automatically by comparison with corresponding operating systems, files and databases on the primary computer system, so that the copy computer system verifies its stored files against the original data on the primary computer system, either on demand or as scheduled by the system. The comparison is preferably initiated automatically by the copy computer system.

The functional verification test may be preceded by a bit-by-bit test between data on the primary storage means and data on the backup storage means as a first step of verification.

a) testing operating system

The test is preferably conducted by starting the operating system and checking services to be started by said system. A comparison is made based on a checklist from the primary computer system. Furthermore, a check of failure logs may be provided. For some operating systems this test should be preceded by a step of rebooting the copy computer system with data from backup medium.

b) test one or more files on the copy computer system

The test may be conducted manually by accessing one or more files and testing the integrity of the files. In a preferred embodiment the files are tested automatically by comparing predetermined features of the files on the copy computer system with features of the same files on the primary computer system. Examples of features are file's last access date, time stamp, the file's extended attributes (protection mode, owner, etc.) Furthermore, at check sum of the file on the copy computer system may be compared to the check sum of the file on the primary computer system. Also the entire content of the file on the copy computer system may be compared with the entire content of the same file on the primary computer system, such as check of a number of files selected stochastically among the backed up files.

c) testing requests to files or databases

The functionality of databases cannot be tested merely by comparison of files, but instead the verification procedures may include performing identical requests on the copy computer system and the primary computer system and comparing the results.

The functionality of files can be tested by using the host program or a parser which opens and verifies that the contents of the files comply with the specification of the specific file type (for example Microsoft Word, Microsoft Excel, Adobe Acrobat etc.) The test may also include performing identical requests on the copy computer and the primary computer system and comparing the results.

d) testing one or more files or database requests by accessing one or more files or requests and check the result of the files or the request. For example the result of a request could be generated in the primary computer system copied to the copy computer and compared with a similar request in the copy computer system.

e) testing custom services

Customized programs and services specific for the primary computer system may of course also be verified according to the present invention.

In case the verification procedure is conducted through a network the necessary parts of the identity of the copy computer (being identical to the primary computer due to the copying procedure) must be changed before the verification procedure commences. For example in present Linux systems the identity change may be accomplished by a program whereas the identity change in Windows NT may be accomplished by a program followed by rebooting the computer.

A message will be given if the verification procedure identifies failures of the backed up data, so that necessary measures can be taken inclusive initiation of a new backup procedure, optionally by using another backup medium. In a preferred embodiment a message is given at the conclusion of the verification whether concluded successfully or not.

After the verification procedure is concluded successfully, the removable backup medium, if any, may be stored at any suitable place, such as in a box protected from fire etc, and the user may be confident that the data on the removable backup medium will function in case of failure, since functional tests have already been conducted. Then the copy computer may be used for its predetermined purpose. In one embodiment the copy computer enters a stand-by mode wherein one or more of the following options may arise:

The read/write mode of the system is deactivated (no admittance to the data is possible) until the copy computer is going to be used again, for example as a stand-in.

In case replicating databases are backed up, it is appropriate that the stand-by mode includes deactivation of the replication function. In case it is desired that the copy computer be continuously updated, the copy computer may take part in the replication.

The part of the computer comprising the copy data is delimited from the rest of the copy computer, and the residual part of the copy computer may be used for another purpose, for example as a normal client/portable computer.

Stand-In Server

In case the service of a primary computer system becomes unavailable, whether due to failure or scheduled maintenance, either a human system manager or an automatic initiation program may invoke the copy computer system's stand-in mode for the failed server. In stand-in mode, the copy computer system provides users with access to the data hitherto available from the unavailable primary computer system.

When the copy computer system assumes stand-in mode for a failed computer, the copy computer system executes a procedure to identify itself to the network as the failed server and then services all requests for failed primary computer system from the network. Clients who have lost their connection due to failed primary computer system are connected to the copy computer system when they login again, either manually using the same login method they normally use, or automatically by their standard client software. The copy computer system can provide more than file services and database services, for instance the copy computer system can provide stand-in printing services and other common peripheral support services. The complete transition requires very short time, often less than a few minutes, and it may not require the copy computer system to reboot depending on the particular operating system as discussed above. The only risk of loss of data is due to the fact that the version of a file will only be as recent as the last time a backup procedure was performed or updated due to for example replication procedures, automated copy procedures, etc.

When the copy computer system is to be used as a stand-in computer, it is normally preferred that the storage means is capable of having a read-only mode. Thereby clients are capable of reading data on the stand-in computer, but since no data are written into the copy storage means during the stand-in period, no up-dating procedures of the primary storage means, and/or the backup storage means are necessary.

If the copy computer system may be used as stand-in also for a longer period it may be appropriate to provide a copy storage means capable of switching between read-only mode and read-write mode leading to a more flexible system. In this case when the failed primary computer system recovers, the data of the primary computer system are restored from the copy computer system with the changes that took place while the copy computer system stood in for the failed primary computer system.

Furthermore, the copy computer system may be used for testing new configurations etc. to check the possibilities of new configurations before introducing them on the primary computer system. The invention further provides a secured progress of the procedures of replacing old computers, replacing lost computers, upgrading programs and/or computers.

Several Primary Computer Systems

The invention further provides the possibility that a single copy computer system can support a plurality of primary computer systems, that is that a single copy computer system may be used for functional verification of backups from more than one primary computer system. Accordingly, the invention also relates to a method used for backing up data from at least a first primary computer system and a second primary system, comprising
a) reading data from the first primary storage means,
b) writing said read data to the backup storage means,
c) arranging a copy computer system having a copy storage means,
d) reading backed up data from the backup storage means,
e) writing backed up data to the copy storage means,
f) obtaining copy data,
g) comparing copy data with data on the first primary storage means thereby verifying the backed up data, and
h) repeating steps a) to g) for the second primary computer.

As well as a method for copying data from more than one primary computer system, such as a method for copying data in at least one primary computer system from a primary storage means to a copy storage means and verifying said copied data, said method comprising:
a) reading data from the primary storage means,
b) arranging a copy computer system having a copy storage means,
c) writing data to the copy storage means,
d) obtaining copy data, and
e) comparing copy data with data on the primary storage means thereby functionally verifying the backed up data.

The only requirements for the copy computer system are that it is compatible with all primary computer systems, and that the storage capacity of the copy computer system corresponds to the necessary storage capacity for the largest primary storage means of the primary computer systems. The procedure can be performed by allocating individual backup storage means for each primary computer system, such as one medium per primary computer system or alternatively it can be performed by the reuse of a common storage means in the case of verified backups stored on external media. Also data from several servers may be arranged on one or more backup media, for example through tape robots, tape loaders, SAN or NAS.

In case one of the primary computer systems falls, all that is necessary to provide a stand-in computer is writing the latest backup data to the copy computer, and subsequently the copy computer may function as stand-in for the primary computer system.

Also, the backup system may be used for backing up several primary computer systems, wherein the backup is conducted by backing up two or more primary computer systems onto one medium, or a series of media. Thereby, the verification procedure is conducted per media, and the copy computer system is capable of locating the data corresponding to a specific primary computer system selectively, independent of location on the backup storage medium. Such a backup system may for example be a backup robot.

Also, the present invention is useful to backup storage means located at different locations but connected by a network, such as storage area networks (SAN), or Network Area Services (NAS) and servers arranged in clusters.

The present invention is not dependent on any specific backup program or operative system, and may therefore be used in any combination of systems, backup programs and operative systems. Thus, the present invention may be used with a backup program selected from Microsoft Tape Format® (MTF) with NTBackup, Veritas BackupExec®, Cheyenne ArcServe® as well as any other commercially available backup system.

Another advantage of the present invention is that is may be conducted in connection with a wide variety of operating systems, such as Microsoft Windows NT®, all versions, Microsoft Windows 2000 Server®, Microsoft Windows 2000 Advanced Server®, Novell Netware® v. 3, v. 4, Linux, including distribution from Redhat, Debian, etc., Mac OS X® and Mac OS 8®, and Unix Systems, such as Solaris®.

Example 1

Figure 1:
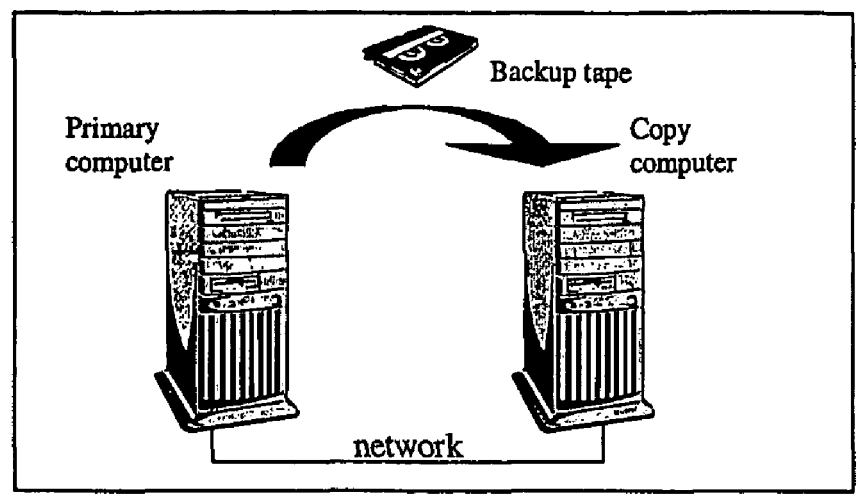

The system set-up in FIG. 1 shows a primary computer system and a copy computer. The arrow shows the route of the backup medium denoted Backup tape from the primary computer system to the copy computer system. Verification of the data copied to the copy computer system is conducted through the network connection between the primary computer system and the copy computer system.

Figure 2:
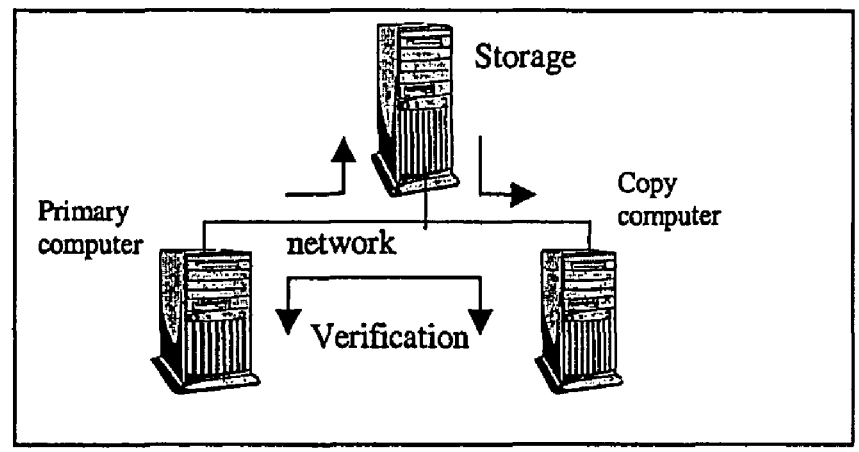

The system set-up in FIG. 2 shows another embodiment of the invention having a primary computer system and a copy computer. The arrow shows the route of the data from the primary computer system to a remote computer denoted Storage acting as a backup storage means and further from the remote computer to the copy computer system. Verification of the data copied to the copy computer system is conducted through the network connection between the primary computer system and the copy computer system.

Figure 3:
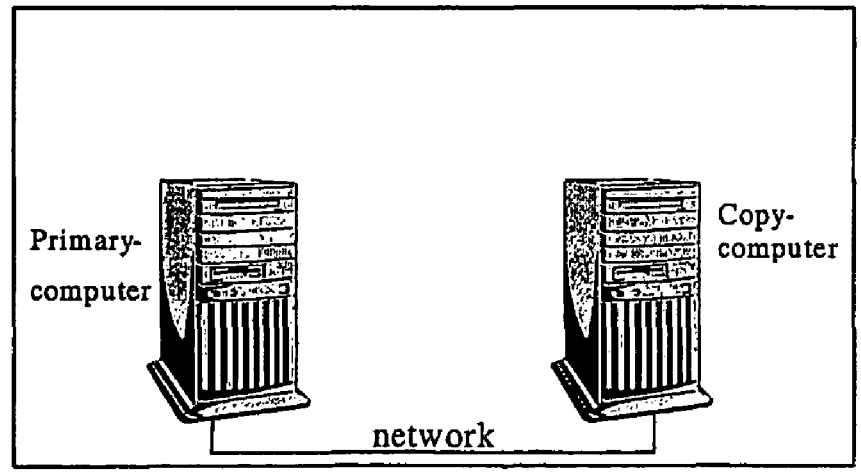

The system set-up in FIG. 3 shows an embodiment of the invention, wherein the data are copied directly from the primary computer system to the copy computer system through the network connection, and the verification of the data copied to the copy computer system is conducted through the same network connection between the primary computer system and the copy computer system.

Example 2

Primary Computer with Tape Driver

From the primary computer (see FIG. 9), a backup of data is transferred to backup tapes. After completion, readout of data from backup tapes (connected to primary computer) to the copy computer is initiated. The system configuration is adapted, and the copy computer is restarted. Verification may be carried out if desired.

Example 3

A set of primary computers (see FIG. 10) transfers their backup to a central backup computer to which a backup unit, a tape robot, etc. are connected. After completion of the backup, the copy is transferred to a copy computer which again tests each completed security copy.

Example 4

A system (see FIG. 11) has an SAN/NAS with connected backup unit. A backup is taken of the contents of the SAN/NAS. After completion of the backup, the data are transferred back to a copy computer or downsized SAN/NAS.

Example 5

The system (see FIG. 12) is similar to the one described in Example 4, but with a different purpose. A backup is taken from the point of view of the primary computer. Data/software may be stored on NAS/SAN, but the backup only contains the data which make the primary computer function in a correct manner. SAN/NAS may contain data for other primary computers, but these data may be copied for security purposes on another occasion. The location of backup drives is not important. They may be located at NAS/SAN or the copy computer as appropriate.

Example 6

A system (see FIG. 13) has a central storage means housing security copies for companies/affiliates. A backup is taken of all primary computers onto an SAN/NAS storage means. The stored security copies may be tested by transferring data from SAN/NAS to a copy computer located either centrally or locally.

Example 7

Figure 5:
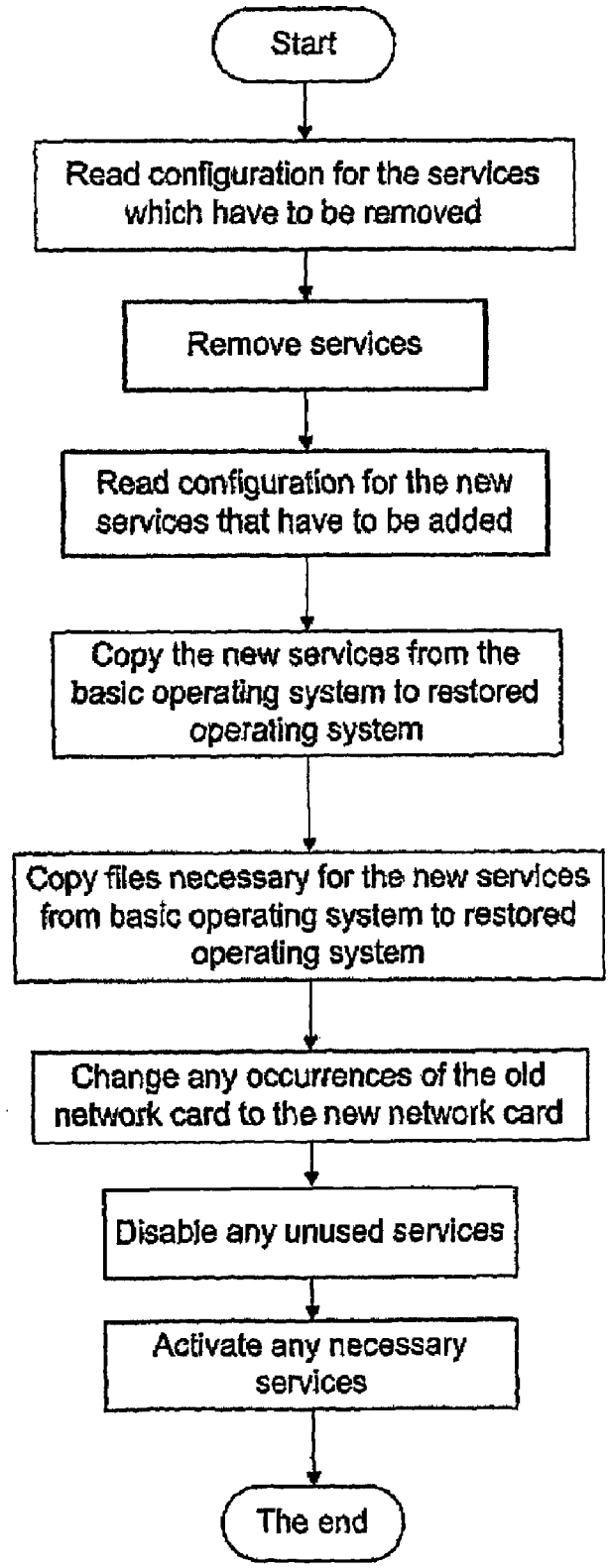
FIG. 5 shows a flow chart for the change of hardware.

The programming for an example of the method according to the invention is shown in this example in relation to Microsoft Tape Format (MTF), NT Backup:

Depending on the operating system, hardware change may be conducted as shown in the flow chart in FIG. 5, and examples of the programming steps are shown below:

```
Void hardware_change( )
Begin
    Open closed registry
        Change security access for selected keys
        While Reading configuration for keys to delete
            Erase key
        While Reading configuration for keys to add
        Copy key and subkeys from running registry to closed
registry.
            Copy files found in the keys.
        Restore security access to original setup
        Delete network card from closed registry
        Copy network card from running registry to closed
registry
        Change any occurrence of the name of the network
        card in the closed registry.
        Change startup value for the AT-disk controller
        If dual processor kernel then change kernel files
            Close registry
End
```

Figure 4:
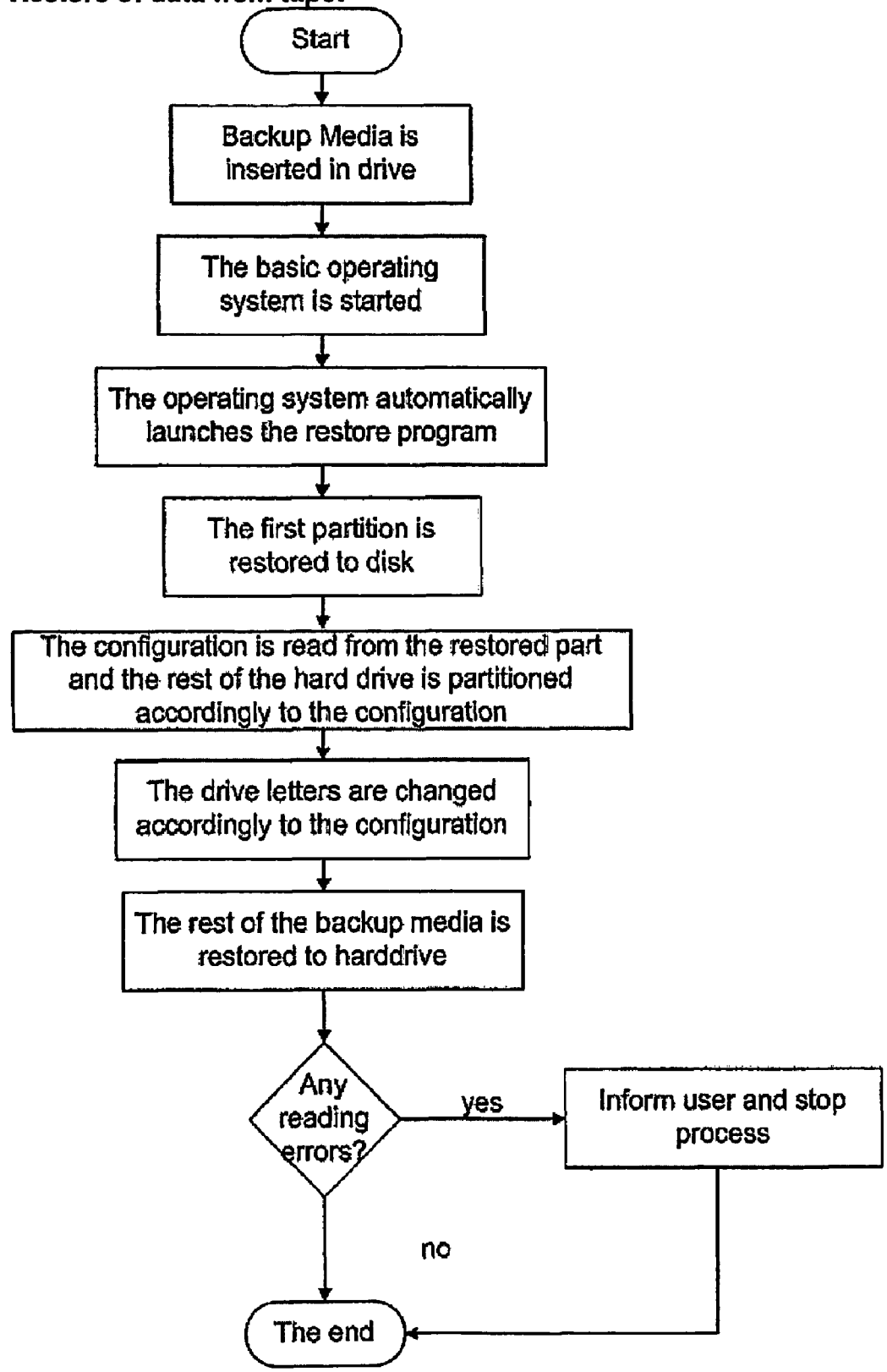
FIG. 4 shows a flow chart for the restore procedures.

Restore procedures may be conducted as shown in the flow chart in FIG. 4, and examples of the programming steps are shown below:

```
Void restore( )
Begin
    Connect to tape
    Read tape information
    While reading Read tape
        Case volume:
            If second partition
                Read configuration from close
                registry
                Create partitions
        Case dir:
            Move to new directory position
            Create new directory
            Enter directory
        Case file:
            Create new file
            Copy contents from tape to file
            Close file
        Case security:
            Apply security to either file or directory
        Case close:
            Close file or directory
End
```

Figure 7:
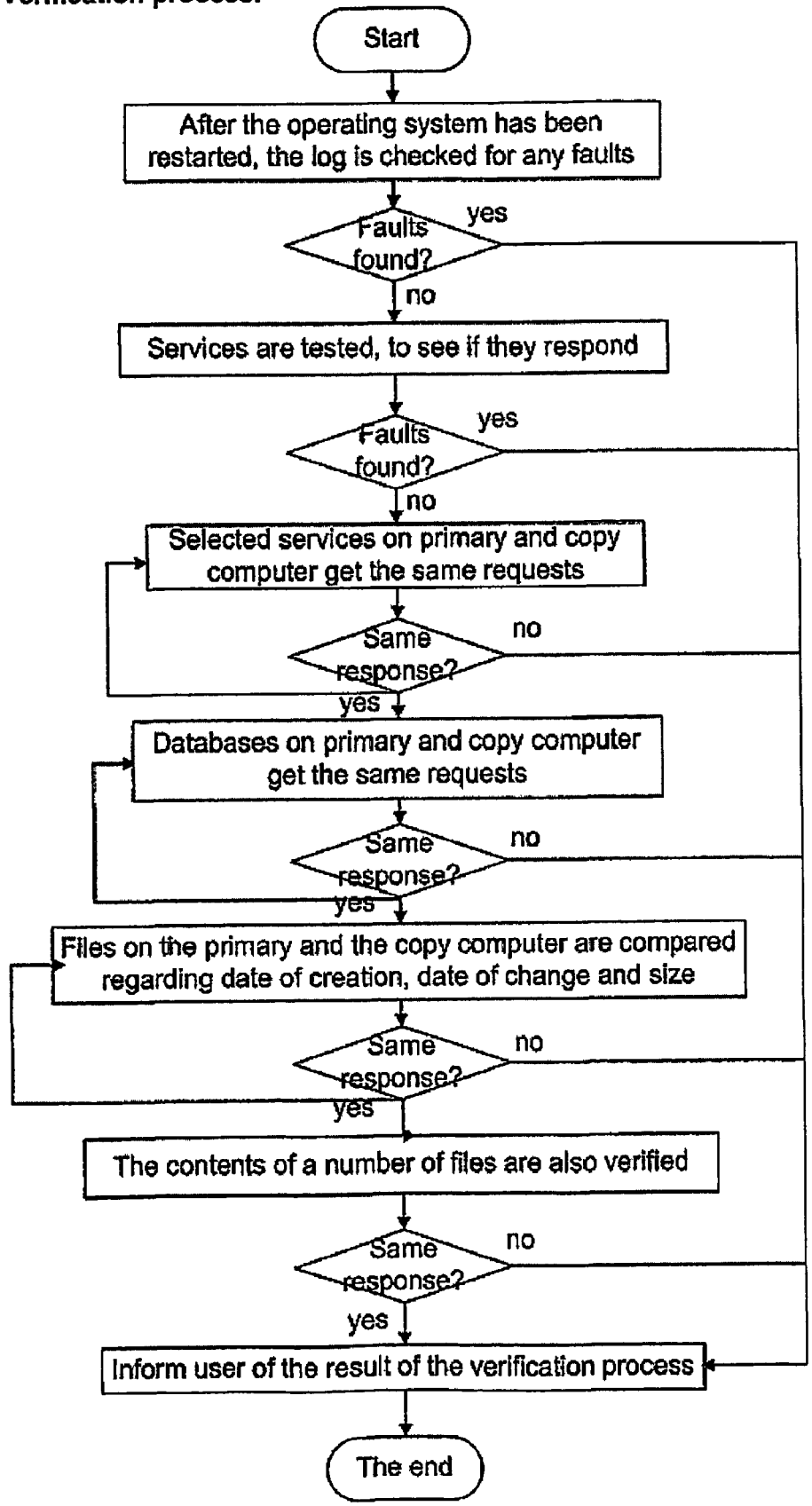
FIG. 7 shows a flow chart for the verification procedures.

Verification may be conducted as shown in the flow chart in FIG. 7, and examples of the programming steps are shown below:

```
Void verification
Begin
        Open connection to event log
    While traversing log
        If errors found then stop
    Close event log
        Retrieve list of active services
        Compare with list of services supposed to start
        If differences found then stop
    (only if DNS-services exists)
    Send a request to a DNS service on both primary and
    copy computer
    Compare answers
    If differences found then stop.
    While traversing partitions
        While traversing directories
            While traversing files
                Connect to a network drive on the
                primary computer
                Compare files and directories not
                touched or created after the date of
                the backup on the primary- and copy
                computer
                If difference in the creation date found
                then stop
                If difference in the size found then
                stop
                If difference in the date of change
                found then stop
                If a random number is equal to a selected
                number then
                    Compare contents of files
                    If difference found then stop
    (only if database exists)
        Connect to database on copy computer
    Connect to database on primary computer
        Send data request to databases
        If answers are different then stop
    Inform user about the state of the backup and verification
    process - that is has finished with success.
end
```

Figure 6:
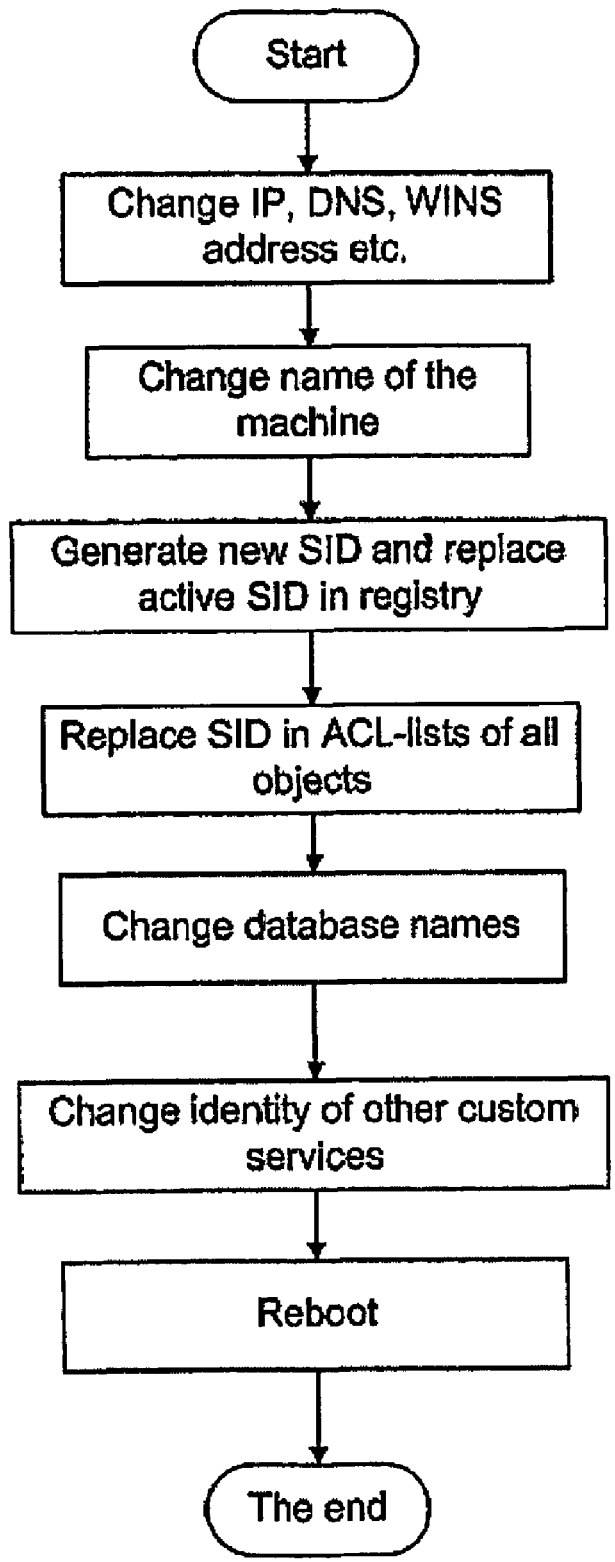
FIG. 6 shows a flow chart for the change of identity of the copy computer.

Identity change may be conducted as shown in the flow chart in FIG. 6, and examples of the programming steps are shown below:

```
void change_identity
begin
        Read configuration
        Open registry
    Find working network card
        Change properties for ip-address, DNS, WINS
        Change the netbios name and domain for the machine
        Find old SID in registry
        Generate new SID and replace it in registry
    While traversing the registry
        Search for the occurrence of the SID in all
        keys in the registry
        Replace the old SID with the new.
        Search the security list of all keys for the
        occurrence of the SID.
            Replace the old SID with the new.
    While traversing the partitions
        Search for the occurrence of SID in the security
        list
        Replace the old SID with the new.
        While traversing the directories
            Search for the occurrence of SID in the
            security list
            Replace the old SID with the new.
            While traversing the files
```

```
                    Search for the occurrence of SID in
                        the security list
                            Replace the old SID with the new.
            If databases active then shutdown
                Find the configuration of the databases in the registry
                Change the identity of the databases
                Activate databases
                Change identity of any custom services in the registry
                Run batch file
                Close registry
            Preset startup value to be operating system from
            primary computer
                    Reboot
    End
```

Figure 8A:
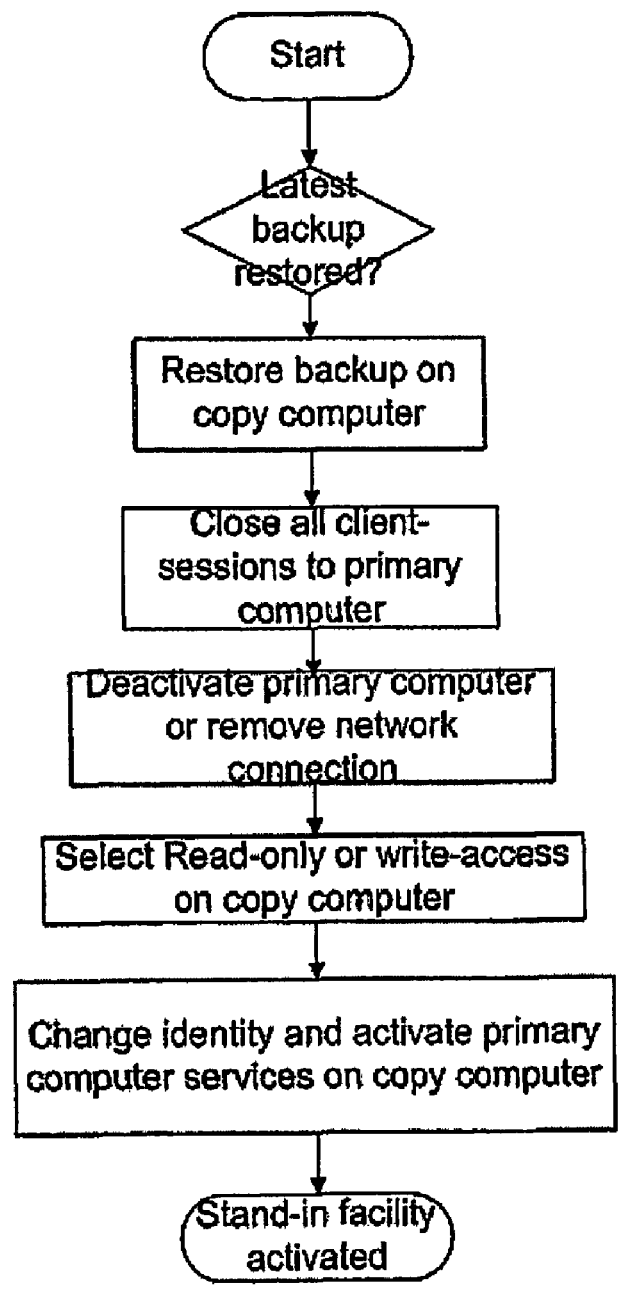
FIG. 8 shows a flow chart for the stand-in procedures.
Figure 8B:
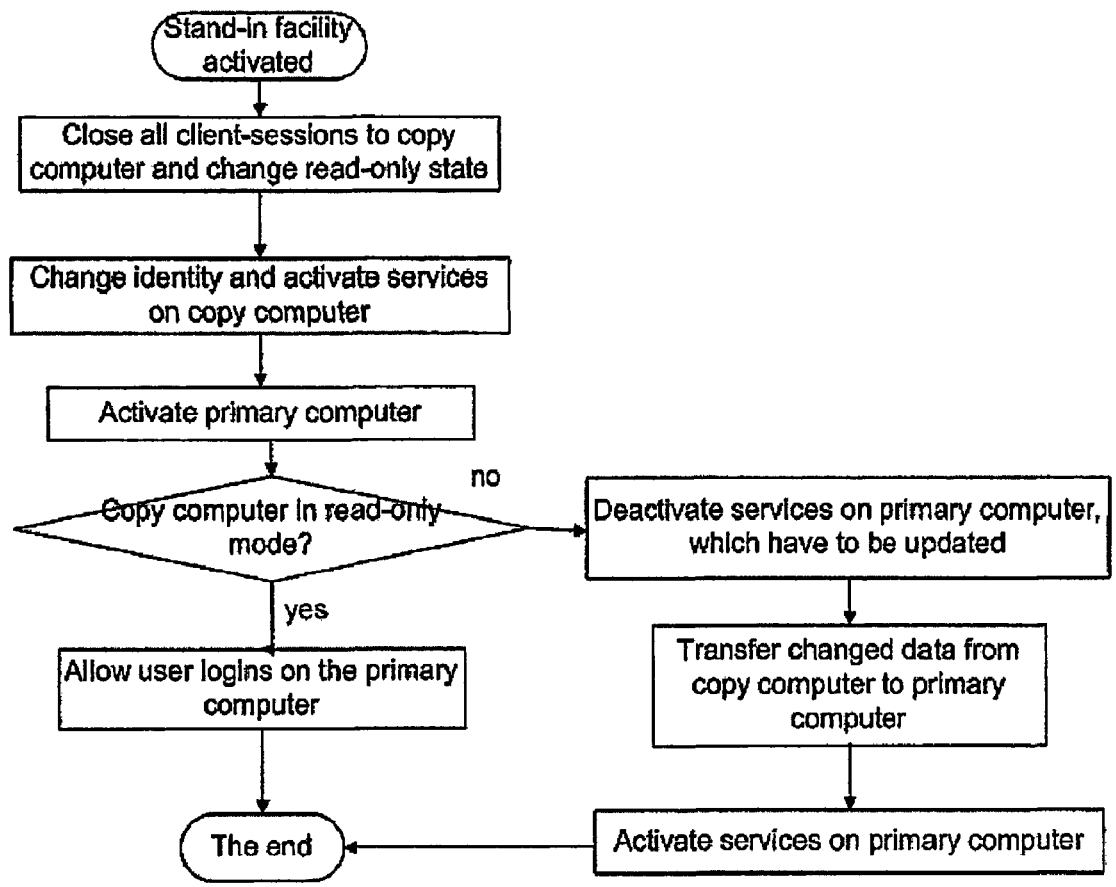

Stand-in may be conducted as shown in the flow chart in FIG. 8, and examples of the programming steps are shown below:

```
Void standin( )
Begin
        Ask if latest backup has been restored
        If not call restore procedure
        Inform user to remove network connection from primary
        computer.
        Send a "ping" to primary computer.
        If still active wait
        Else continue
        Call Identity change procedure
        Restore share keys in the registry
        Ask user if he wants read-only or write-access
        If read-only change keys for the shares
            Change startup state of deactivated services
            Reboot
End
Void Stand-out( )
Begin
        Send message to users and inform them to close connection
        to server.
        If users still active wait
        Else continue
        Change to read-only for the shares in the registry.
        Call identity change procedure.
        Deactivate server services
        Reboot
            //In the meanwhile turn on the primary computer
        //After restart manually copy changed files from
        copy computer to primary computer, including databases.
End
```

An example of the code for the program is included in the computer program listing appendix which is incorporated herein in its entirety by reference.

The invention claimed is:

1. A method for backing up data from at least a first primary computer system from a first primary storage means to a copy storage means, backing up data from at least a second primary computer system from a second primary storage means to said copy storage means, and subsequently verifying said backed up data, said method comprising:

for the first primary computer system:

a) reading data from the first primary storage means, b) arranging a copy computer system having the copy storage means, c) writing data to the copy storage means, d) obtaining copy data, e) before a predetermined use of the copy data, testing the functionality of the copy data by testing that the copy data is accessible by reading the copy data, and by testing that the copy data may be used in the same way as it could in the first primary computer system, whereby verification of files stored on the copy computer system is conducted against a body of original data from operating systems, files and/or databases on the first primary computer system, thereby functionally verifying the copied data before the predetermined use of said copied data; and for the second primary computer system:

repeating steps a) to e) for the second primary computer system.

2. The method according to claim 1, wherein the verification comprises functional test of any operating system copied onto the copy storage means.

3. The method according to claim 1, wherein the verification comprises comparison of files of the copy storage means and the primary storage means.

4. The method according to claim 1, wherein the verification comprises at least the following steps:

a) testing operating system b) testing one or more files on copy computer system c) testing requests to databases.

5. The method according to claim 1, wherein the primary computer system is selected from a server or a working station.

6. The method according to claim 1, wherein the copy computer system is identical with the primary computer system.

7. The method according to claim 1, wherein the copy computer system is different from the primary computer system.

8. The method according to claim 7, wherein the copy storage means is smaller than the primary storage means.

9. The method according to claim 1, wherein the copy storage means is in a read-only mode.

10. The method according to claim 1, wherein the copy storage means is capable of switching between a read-only mode to a read-and-write mode.

11. The method according to claim 1, wherein the primary storage means is connected to the copy storage means through a network.

12. The method according to claim 11, wherein the network is an intranet.

13. The method according to claim 11, wherein the network is an extranet.

14. The method according to claim 11, wherein the network is the Internet.

15. The method according to claim 1, further including the step of converting the copy computer system to a stand-in primary computer system in case of failure of the primary computer system.

16. The method according to claim 1, wherein the copy computer is an upgraded computer system compared to the primary computer system.

17. The method according to claim 1, wherein the data read from the primary storage means is written to a backup storage means, and then data is read from the backup storage means and written to the copy storage means.

18. The method according to claim 17, wherein the backup storage means is an external removable storage medium.

19. The method according to claim 18, wherein the storage medium is selected from a magnetic tape, a disk, a DVD, a CD-ROM, a memory smart card, an optical crystal.

20. The method according to claim 17, wherein the backup storage means is an external storage means connected to the primary storage means through a network.

21. The method according to claim 20, wherein the network is an intranet.

22. The method according to claim 20, wherein the network is an extranet.

23. The method according to claim 20, wherein the network is the Internet.

* * * * *